United States Patent [19]
Lu

[11] Patent Number: 5,216,328
[45] Date of Patent: Jun. 1, 1993

[54] VEHICLE LIGHTING SYSTEM

[76] Inventor: Tan T. Lu, 10 Sunny Glenway, Apt. PH4, Don Mills, Ontario, Canada, M3C 2Z3

[21] Appl. No.: 785,412

[22] Filed: Oct. 30, 1991

[51] Int. Cl.⁵ ............................................. H05B 39/10
[52] U.S. Cl. ........................................ 315/88; 315/82; 315/93; 307/10.8
[58] Field of Search ............... 315/88, 82, 89, 90, 315/91, 92, 93, 136; 307/10.8, 38, 89

[56] References Cited

U.S. PATENT DOCUMENTS

| | | | |
|---|---|---|---|
| 2,342,639 | 2/1944 | Bradley | 315/88 |
| 2,528,245 | 10/1950 | Riggins | 315/93 |
| 3,644,886 | 2/1972 | Sabaroff | 315/82 X |
| 3,825,769 | 7/1974 | Alford, Jr. | 315/93 X |
| 4,029,991 | 6/1977 | Schultz | 315/135 |
| 4,091,307 | 5/1978 | McNamara, Jr. | 315/92 |
| 4,195,281 | 3/1980 | Bell | 315/82 X |
| 4,380,718 | 4/1983 | Miller | 315/93 |
| 4,712,051 | 12/1987 | Fathi | 315/88 X |

*Primary Examiner*—Eugene R. LaRoche
*Assistant Examiner*—Son Dinh
*Attorney, Agent, or Firm*—Mirek A. Waraksa

[57] ABSTRACT

A lighting circuit for a vehicle illuminates a back-up lighting element when a primary lighting element fails. Both lighting elements may be installed in a single housing, such as a headlight assembly. A dashboard switch places the primary lighting element in circuit with the vehicle power supply. In preferred form, a low-resistance coil is series connected with the primary lighting element. The coil is magnetically coupled to switching elements in a low-current flow path between power supply terminals. Switching elements in the low-current flow path control a low-power mechanical switch that places the back-up lighting element in circuit with the power supply. If the primary element fails, the absence of current through the coil triggers the switching elements to close the mechanical switch and to illuminate the back-up element. The dashboard carries a graphic representation of the vehicle. A light emitting diode on the representation is illuminated when the primary element fails to πindicate the location of the failed element.

4 Claims, 2 Drawing Sheets

VEHICLE LIGHTING SYSTEM

FIELD OF THE INVENTION

The invention relates generally to vehicle lighting systems, and, more specifically, to a circuit providing back-up and failure indication for headlights and various indicating lights.

BACKGROUND OF THE INVENTION

It is quite common for a motorist to be unaware that a headlight, tail light or brake light has failed. This is particularly true when driving in cities where streets are well illuminated. Failure of such lights and other external status-indicating lights associated with a vehicle poses safety hazards and often constitutes a violation of regulations respecting vehicle operation. The present invention addresses such problems.

SUMMARY OF THE INVENTION

In one aspect, the invention provides a lighting circuit connected to the power supply of a vehicle. The circuit includes a first lighting element in a headlight, tail light, brake light, turn-signal indicator or reverse-gear indicator. A manually-operable switch places the first lighting element in circuit with the power supply. The switch has a closed state in which it enables current flow to the lighting element and open state in which current flow is disabled. A second lighting element is positioned proximate to the first lighting element and adapted to duplicate the relevant illuminating function. Switching means place the second lighting element in circuit with the power supply, the switching means enabling current flow through the second lighting element in response to the closed state of the manually-operable switch and simultaneous absence of current flow through the first lighting element. Current flow through the second lighting element is otherwise disabled. In preferred form, indicating means on a vehicle control panel, positioned for viewing by the vehicle operator, indicate failure of the first lighting element when current flows through the second, back-up lighting element. The indication preferably involves a graphic representation of the vehicle with a failure-indicating element, such as a light emitting diode (LED), positioned on the graphic representation to indicate the actual location of the failed light on the vehicle.

In another aspect, the invention provides a lighting circuit connected to power output terminals of the power supply of a vehicle. The circuit comprises a first current flow path between the output terminals. A first lighting element is located in the first current flow path for illumination by a current flow along the first current flow path. A second current flow path is coupled to the power output terminals, parallel to the first current flow path. A second lighting element is located within the second current flow path for illumination by a current flow along the second current flow path. The second lighting element is positioned proximate to the first lighting element and adapted to duplicate the illuminating function of the first lighting element. Switching means disable current flow in the second current flow path in response to current flow in the first current flow path and enable current flow in the second current flow path in response to absence of current flow in the first current flow path.

Other aspects of the invention will be apparent from a description below of a preferred embodiment and will be more specifically defined in the appended claims.

DESCRIPTION OF THE DRAWINGS

The invention will be better understood with reference to drawings illustrating a preferred embodiment in which.

DESCRIPTION OF PREFERRED EMBODIMENTS

Figure 1:
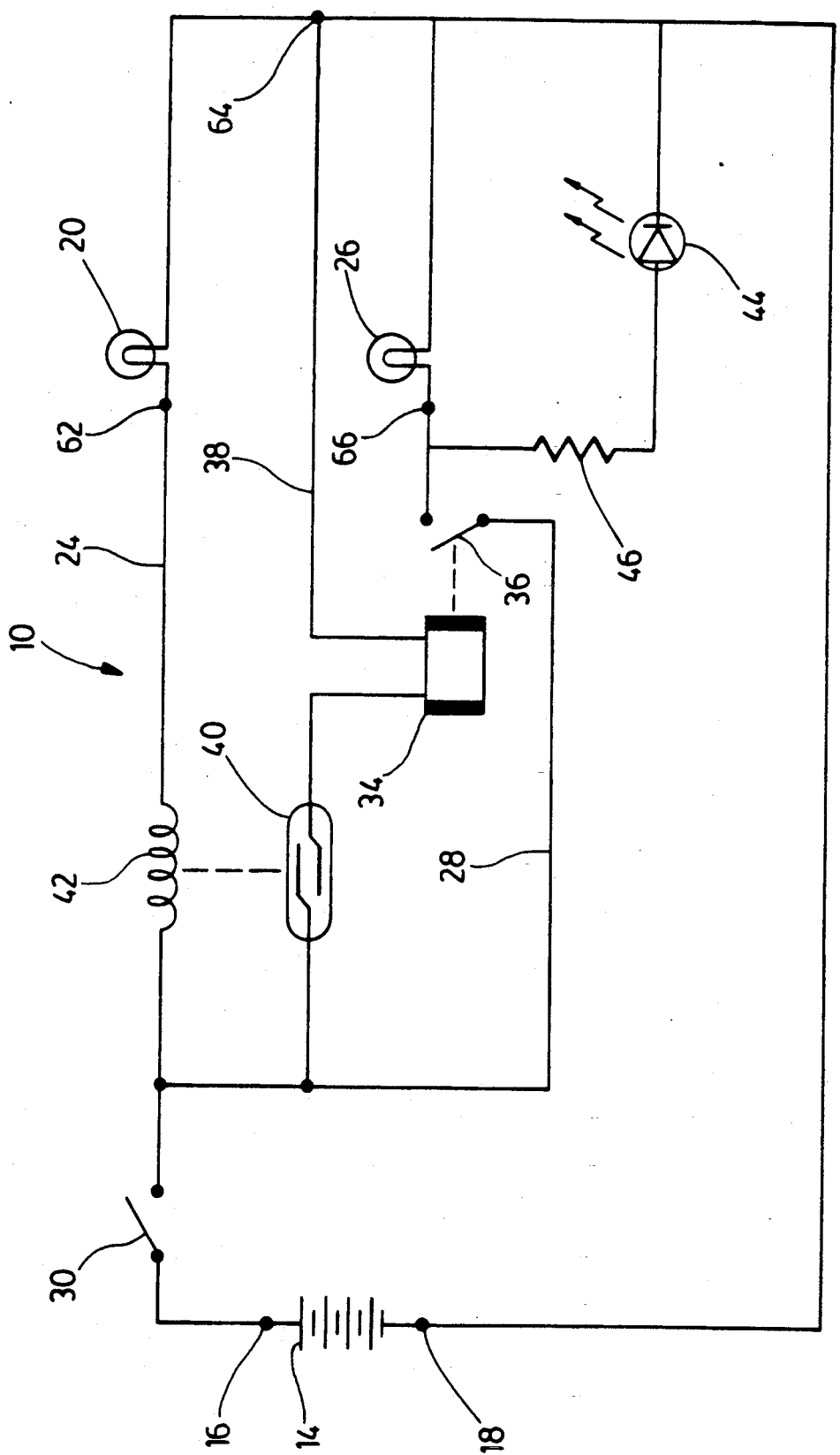
FIG. 1 is schematically illustrates a vehicle lighting circuit.
Figure 2:
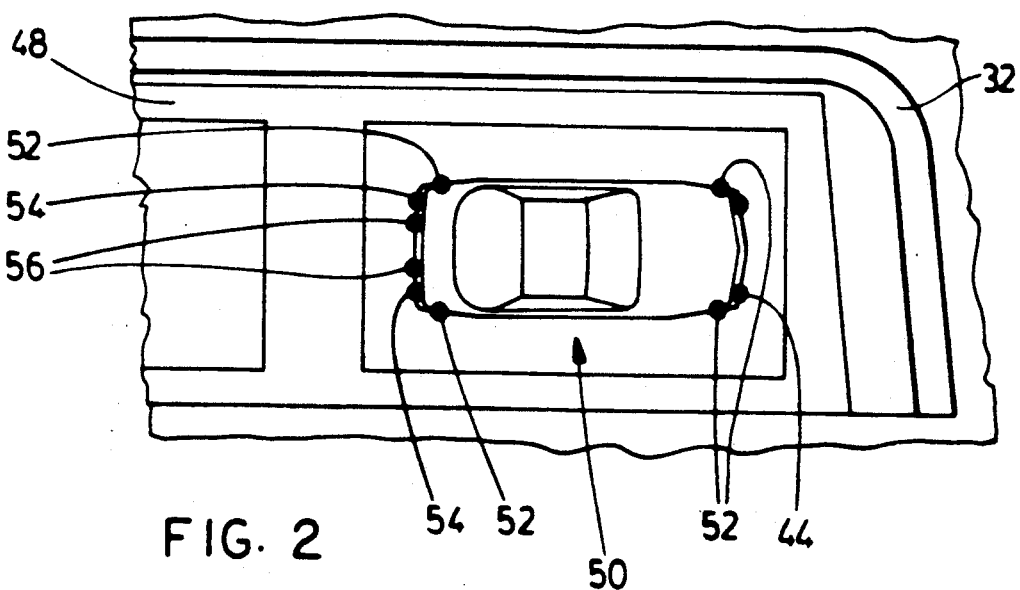
FIG. 2 is a fragmented view diagrammatically illustrating a vehicle control panel adapted to indicate the location of a failed vehicle light.
Figure 3:
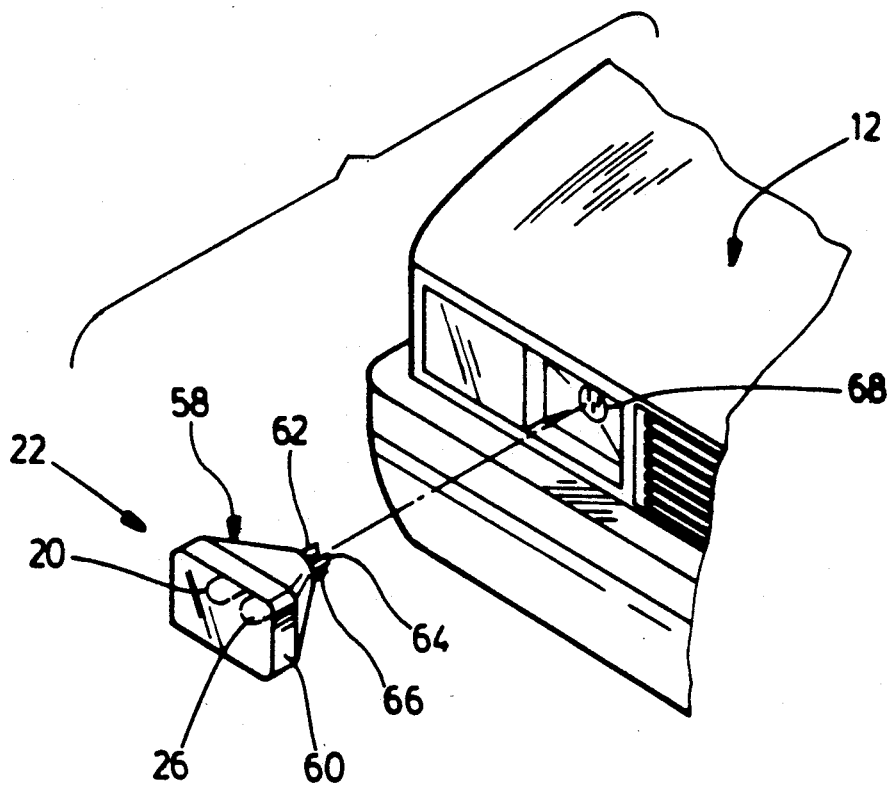
FIG. 3 is a fragmented perspective view showing a preferred arrangement of primary and back-up lighting elements.

Reference is made to FIG. 1 which illustrates a lighting circuit 10 connected to the power supply of an automobile 12 (indicated in FIG. 3). The power supply includes a battery 14 connected between supply terminals 16, 18. The power supply would normally include an alternator (not illustrated) in parallel with the battery 14 at the supply terminals 16, 18. A primary lighting element 20 is located in a first current flow path 24 between the power supply terminals 16, 18. It may be an electric light in a headlight assembly 22 as indicated in FIG. 3. A second back-up lighting element 26 is located in a second current flow path 28 parallel to the first current flow path 24. The back-up lighting element 26 is positioned proximate to the primary lighting element 20 and adapted to duplicate its lighting function (as described more fully below), namely, to illuminate the roadway with the same intensity as the primary light and cooperate with a reflector (not indicated) to illuminate in the same general direction. The lighting circuit 10 is controlled by a manually-operable switch 30 that couples not only the primary lighting element 20, but the entirety of the lighting circuit 10, to the power supply terminals 16, 18. The manually-operable switch 30 would normally be provided in a conventional manner on the dashboard 32 of the vehicle 12. In a closed state, the switch enables current flow along the first flow path 24 and illumination of the primary lighting element 20. In an open state, such current flow is disabled.

Switching means in the circuit 10 serve to activate the back-up lighting element 26 if the primary lighting element 20 fails. In circuit 10, such means are responsive to absence of current flow in the first flow path 24 and the closed state of the manually-operable switch 30. The preferred switching means, which comprise a coil, reed switch and relay, are more complicated than is necessary to implement the broader aspects of the invention. However, the particular configuration reduces heat dissipation requirements and enhances energy efficiency, as explained more fully.

The circuit 10 includes a relay comprising a control section 34 and a controllable switch 36. The controllable switch 36 is in series with the back-up lighting element 26 and controls current flow along the second flow path 28 through the back-up lighting element 26. The switch 36 is normally biased to an open state, tending to disable current flow along the second flow path 28 through the back-up lighting element 26. It is switched to a closed state enabling such current flow by operation of the control section 34 of the relay. The control section 34 switches the switch 36 to its closed state in response to current flow along a third flow path 38 parallel to the first and second paths 24, 28. The control section 34 is in series in the third flow path 38 with a reed switch 40. The reed switch 40 is biased to a normally closed state which enables current flow along the third flow path 38. It is controlled by a coil 42 that is in series with the primary lighting element 20 in the first flow path 24. The coil 42 is preferably constituted by a few windings of wire and is magnetically coupled to the reed switch 40 by winding directly about the exterior of the reed switch 40. The normal flow of current through the primary lighting element 20 causes the coil 42 to switch the reed switch 40 to an open state. A LED 44 and a current-limiting resistor 46 are connected to the second flow path 28, in parallel with the back-up lighting element 26. With the controllable switch 36 closed, the back-up lighting element 26 and the LED 44 are simultaneously illuminated. The LED 44 is used to indicate a failure of the primary lighting element 20, as explained more fully below.

Operation of the circuit 10 will be briefly described. No current flow through the circuit 10 and no illumination of any lighting element occurs until the manually-operable switch 30 is placed in its closed state. If the primary lighting element 20 is operative, a current flows along the first flow path 24 and the primary lighting element 20 is illuminated. That current also flows through the coil 42 in the first flow path 24 thereby switching the reed switch 40 to its open state. This disables current flow along the third flow path 38 and consequently through the control section 34 of the relay. The controllable switch 36 is in the open state to which it is intrinsically biased, ensuring that the back-up lighting element 26 and the LED 44 are extinguished.

If the primary lighting element 20 fails, no current flows along the first flow path 24. The coil 42 no longer maintains the reed switch 40 in its open state, and the reed switch 40 returns under its inherent bias to a closed state. This enables current flow in the third flow path 38 through the control section 34 of the relay. The control section 34 then switches the controllable switch 36 to a closed state. This enables current flow along the second flow path 28, illuminating the back-up lighting element 26. The failure-indicating LED 44 is simultaneously illuminated. These back-up and failure-indicating functions are of course responsive to the state of the manually-operable switch 30, being initiated only in response to closing of the switch 30 and simultaneous absence of current flow in the first flow path 24.

Status of the vehicle's lights is indicated on a control panel 48 in the interior of the vehicle 12. The control panel 48 is positioned on the vehicle dashboard 32 where it can be viewed by the driver during normal vehicle operation. A graphic representation 50 of the vehicle 12 is provided on the control panel 48. The LED 44 is positioned at the forward end and to the right of the graphic representation 50. That position corresponds to the physical location of the headlight assembly 22 on the vehicle 12. Accordingly, when the primary lighting element 20 of the headlight fails and the back-up element 26 assumes the required illuminating function, the LED 44 is simultaneously illuminated on the graphic representation 50 of the vehicle 12. This indicates both the failure of the primary lighting element 20 and its location on the vehicle 12. The motorist can then promptly replace the failed element.

A separate lighting circuit, comparable to the circuit 10 described above, can be used with each of the more significant lights or sets of lights of the vehicle 12. For each such light, a corresponding LED may be positioned at the rear of the graphic representation 50 of the vehicle 12 on the control panel 48. For example, four LED's (each labelled with a common reference numeral 52) may be appropriately positioned at the sides of the representation 50, forwardly and rearwardly, to indicate the failure of lighting elements associated with turn-signals. Two lighting circuits each with its own manually-operable switch and blinker element may be used to operate left and right pairs of the turn-signal lights and corresponding pairs of the LED's 52. To provide a more precise failure indication, each turn signal indicator would have its own circuit, though a manual switch would be shared by left and right pairs. Tail lights may be associated with two LED's (labeled with a common reference numeral 54) positioned at the rear of the graphic representation 50 of the vehicle 12, one at each extreme side of the graphic representation 50. These lights may share the manually-operable switch 30 with the headlights. Similarly, brake lights may be associated with a pair of failure indicating LED's indicated with a common reference numeral 56. A single manually-operable switch may be shared by the brake lights and will normally be connected to the vehicle brake pedal. In each instance, the physical location of a failed lighting element is graphically indicated to the motorist by illumination of the associated LED on the graphic representation 50 of the vehicle 12.

A preferred form of the headlight assembly 22 is illustrated in FIG. 3. Both the primary and back-up lighting elements 20, 26 are located in the interior of a single housing 58 which has a removable light-transmitting cover. The lighting elements 20, 26 may be mounted in side-by-side sockets (not illustrated) fixed to rear of the housing 58. They may share a reflective surface (not illustrated) formed at the rear interior of the housing 58. They are connected to three male-type power input terminals 62, 64, 66 accessible externally of the housing 58 and insertable into an appropriate socket 68. The three power terminals 62, 64, 66 have been diagrammatically indicated in FIG. 1 to illustrate the required connection to the lighting circuit 10. the three terminals 62, 64, 66 permit the lighting elements 20, 26 to be separately actuated. The lighting elements 20, 26 might alternatively be placed in separate housings side-by-side, but the arrangement illustrated is strongly preferred for space reduction. Other external lights of the vehicle 12 may also be configured as two lighting elements in a single housing, where considered appropriate.

Certain advantages associated with the preferred embodiment of the lighting circuit 10 should be noted. In particular, the third current flow path 38 parallel to the first and second flow paths 24, 28 carries current normally required for control elements. These elements are consequently not obliged to carry the significant currents required to operate the primary and back-up lighting elements and power dissipation in these elements does not become a significant factor. The coil 42 in series with the primary lighting element 20 and the controllable switch 36 in series with the secondary lighting element are, however, obliged to carry the full current required to illuminate each of these lighting devices. However, the coil 42 will generally have a very low resistance. The controllable switch 36 may be a "mechanical" switch (such as that associated with a typical relay), a switch characterized by a metallic conductor that closes the flow path through the switch, rather than a semiconductor device. Accordingly, the coil 42 and controllable switch 36 need not dissipate any significant power. An alternative arrangement might involve placing a power resistor in series with the primary lighting element 20 to function as a current sensor and placing a power transistor in series with the back-up lighting element 26. The base of the transistor might be controlled by the voltage across the resistor which is responsive to presence or absence of current in the first flow path 24. Although simpler, both the resistor and transistor would be obliged to conduct the significant currents associated with the lighting elements 20, 26. This creates a potential for serious overheating unless appropriate heat sinks are provided. Accordingly, the arrangement illustrated, with control functions largely in the low-current third flow path 38, not required to carrying currents for illumination of lighting elements 20, 26, is strongly preferred.

Another advantage associated with the circuit 10 is that the third flow path 38 carries no current while the primary lighting element 20 is operative. This reduces power consumption and extends the life of the relay. Overall operation would appear similar if the controllable switch 36 were biased normally to a closed state and switched to an open state by the relay control section 34 in response to current along the third flow path 38 and if the reed switch 40 were biased normally to an open state and switched by the coil 42 to a closed state in response to current flow along the first flow path 24. However, current would be conducted continually along the second flow path 28 and through the relay control section 34 whenever the primary lighting element 20 was operated.

It will be appreciated that a particular embodiment of the invention has been described and that many modifications may be made therein without departing from the spirit of the invention or necessarily departing from the scope of the appended claims.

I claim:

1. A lighting circuit coupled to a pair of power terminals of a vehicle power supply, comprising:
   a manually-operable switch electrically coupled to one of the pair of power terminals;
   first, second and third current flow paths in parallel relationship between the switch and the other of the pair of power terminals such that current flow along the flow paths is simultaneously enabled or disabled by operation of the manually-operable switch;
   a primary lighting element in the first flow path and located in one of a headlight, a tail light, a brake light or a turn-signal indicator of the vehicle;
   a coil in series with the primary lighting element in the first flow path;
   a back-up lighting element in the second current flow path, the back-up lighting element being positioned proximate to the primary lighting element and adapted to duplicate the illuminating function of the primary lighting element;
   switching means comprising a control section in the third current flow path and a mechanical switching section in series with the back-up lighting element in the second current flow path, the mechanical switching section being biased to an open state in which the mechanical switching section disables current flow through the back-up lighting element and having a closed state in which the mechanical switching section enables current flow through the back-up lighting element, the control section switching the mechanical switching section to its closed state in response to current flow along the third flow path; and,
   a controllable switch in series with the control section in the third current flow path, the controllable switch being biased to a closed state in which the controllable switch enables current flow along the third current flow path, the controllable switch being magnetically coupled to the coil such that current flow along the first current flow path switches the controllable switch to a n open state in which the controllable switch disables current flow along the third flow path;
   whereby, when the manually-operable switch is placed by an operator in its open state to extinguish the primary lighting element, no current flows in the lighting circuit, and when the manually-operable switch is placed in its closed state to activate the primary lighting element, the circuit automatically activates the back-up lighting element in response to failure of the primary lighting element.

2. The lighting circuit of claim 1 for use in a vehicle having a control panel positioned for viewing by a vehicle operator during normal operation of the vehicle, the lighting circuit further comprising indicating means for indicating at the control panel a failure of the primarily lighting element, the indicating means being electrically connected to one of the first and second flow paths and to the other of the power terminals such that the indicating means are actuated in response to current flow along the one of the first and second flow paths.

3. The lighting circuit of claim 2 in which the indicating means comprise:
   a graphic representation of the vehicle;
   a failure-indicating lighting element positioned on the graphic representation of the vehicle in a position corresponding to the location of the primary lighting element relative to the vehicle.

4. The lighting circuit of claim 1 including a housing comprising:
   a light-transmitting cover; and
   a multiplicity of terminals accessible from externally of the housing;
   the primary and back-up lighting elements being mounted within the housing, the lighting elements being electrically connected to the terminals such that the elements can be separately actuated.

* * * * *